April 16, 1968 J. M. UNK ET AL 3,378,674

INFORMATION STORAGE SYSTEM

Filed May 13, 1963 2 Sheets-Sheet 1

INVENTORS
Jacob M. Unk
Oscar A. Guinau
BY
Frank R. Trifari
AGENT

INFORMATION STORAGE SYSTEM

Filed May 13, 1963 2 Sheets-Sheet 2

INVENTORS
Jacob M. Unk
Oscar A. Guinau
BY
Frank R. Jifani
AGENT

United States Patent Office 3,378,674
Patented Apr. 16, 1968

3,378,674

INFORMATION STORAGE SYSTEM

Jacob Marinus Unk, The Hague, and Oscar Augustus Guinau, Haarlem, Netherlands, assignors to North American Philips Company, Inc., New York, N.Y., a corporation of Delaware Filed May 13, 1963, Ser. No. 279,941
Claims priority, application Netherlands, May 15, 1962, 278,483
2 Claims. (Cl. 235—61.12)

The invention relates to a record carrier produced by a printing process and having information in the form of readable (letter and numeral) characters and with coded information corresponding to the said readable information. The coded information being in the form of a series of printed linear parallel marks arranged in a zone extending in the direction of the readable information of the carrier and having a width equal to the length of the linear marks which marks extend transversely to the longitudinal direction of said zone.

It is known to facilitate the administrative processing of a plurality of similar record carriers, for example, checks to provide each check with marks in a given code. These code marks correspond with the readable information on the check, and are in a form allowing reading by mechanical agency, i.e. with the aid of a scanning device converting said code marks into corresponding electrical signals. Said electrical signals can be further processed, if desired with the aid of an intermediate storage and/or a decoding device, for example by means of electronic computers or similar apparatus, to which end the signals may be provisionally stored on magnetic tape or in a perforated paper tape. Said code marks often consist of a material differing by one or more physical properties from the substratum, i.e. the part of the record carrier or check on which the marks are formed. Such material may differ from the substratum for example by radiation absorption, electric conductivity, dielectric constant or magnetic properties.

With checks and the like it is known to have the code marks formed by short lines of magnetisable material placed below each readable character or digit on the check or forming said digits themselves. These code lines (marks) may also be arranged in a narrow zone extending in the longitudinal direction of the record carrier near the edge of the latter, said marks being parallel with the zone and the zone being scanned in the longitudinal direction in the mechanical reading process (British patent specification Nos. 793,102 and 793,103 published April 9, 1958).

The invention is based on the recognition of the fact that with a record carrier of the known kind having longitudinally extending short code lines (marks) gives rise to difficulties in mechanical reading, when the shape of a series of record carriers do not correspond with one another or their original shape. The known method of code marking requires the record carrier to be accurately directed along the scanning device for reading. If the location of the marks is originally determined with reference to a particular edge of the record carrier extending parallel to the marking zone, an accurate orientation of the zone can only be obtained when said reference edge has not been changed. However, the latter condition is not always likely to be fulfilled, particularly if such record carriers are to be handled by the public. The invention provides a method in which code marks on record carriers, deformed by careless treatment by the public, is handicapped only in extreme cases.

In accordance with the invention a record carrier is characterized in that a code zone is formed which has a width of at least one quarter of the corresponding dimension of the record carrier and the code zone is defined by parallel code lines of equal length extending the entire width of the zone. The length of the code zone extends at said width over that part of the record carrier within which the information is contained in the form of printed, readable characters. Such a code zone provides a comparatively wide scanning region for mechanical reading so that an appreciable difference between the direction of the line of scanning of the carrier and the longitudinal direction of the zone of code marks may be tolerated and therefore reference to a changed or mutilated edge of the carrier is not so limiting.

The invention is applicable to many types of commercial paper such as checks drawn on banks or travellers checks, but for clarity and conciseness is described only in relation to a presently preferred embodiment relating to stocks or bonds illustrated, by way of example, in the drawing in which.

Figure 1:
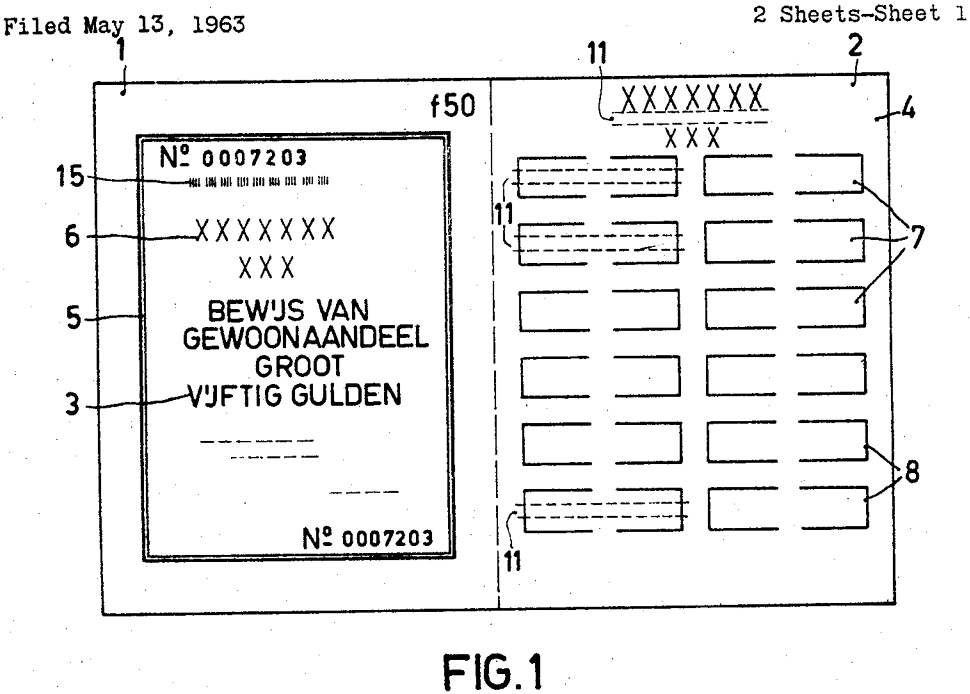
FIG. 1 shows an elevation of a stock or bond certificate according to the invention.
Figure 2:
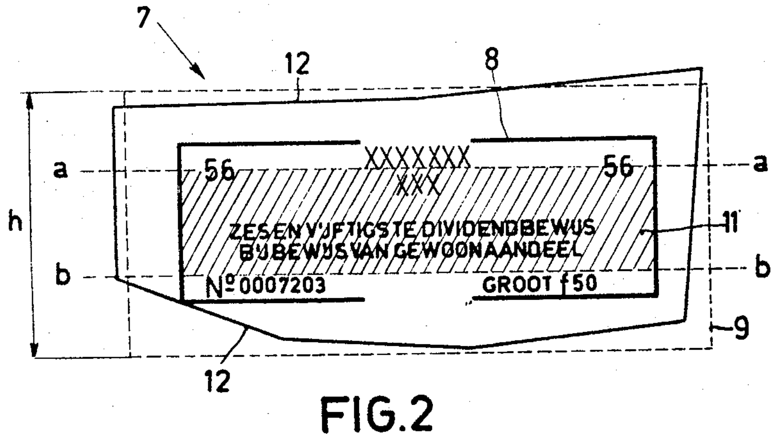
FIG. 2 shows on an enlarged scale part of a dividend warrant according to FIG. 1.

The record carrier according to the invention shown in FIG. 1 in a front view consists of a stock certificate consisting of a printed sheet, the left-hand half 1 of which is the cover or mantle, whereas the right-hand half 2 forms an associated sheet of dividend warrants 7 of a tally 4. The par value is written at 3 on the cover, at the right-hand top said par value is indicated in numeral form. Inside a printed margin or frame 5, the cover bears at the left-hand top and again on the right-hand bottom side the number of the share, for example 0007203. At 6 the symbol XXXXX represents the name of the firm (company or the like) and the address thereof. The tally sheet 4 bears the same indication XXXXX of the firm and comprises for example twelve individual dividend warrants 7. Each dividend warrant 7 comprises within a frame 8 indicated by broken rectangular lines, the same data i.e. the firm name, the number of the share and the par value thereof as indicated on the cover 1 and, in addition, the number of the dividend warrant, which number is indicated within the frame 8 twice in numeral form. This number is different for each of the dividend warrants 7. Normally, these numbers form a sequence. FIG. 2 shows a dividend warrant on an enlarged scale; this warrant has, for example, the number 56.

Figures 3, 4:
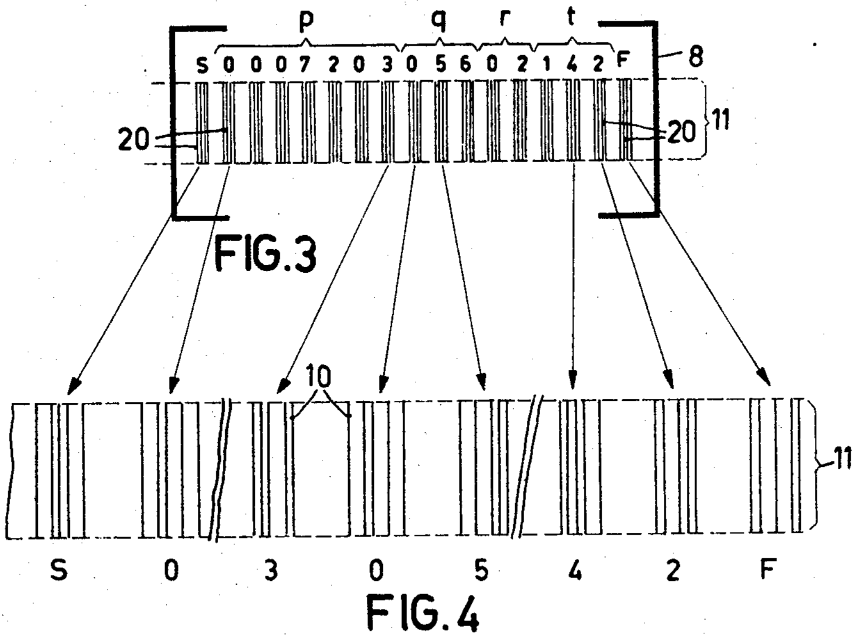
FIG. 3 shows a detail of FIG. 2.
FIG. 4 shows on a larger scale a detail of FIG. 3.

In order to check returned dividend warrants, after they have been centrally collected, without the need for reading the warrant and for sorting the warrants in the order of succession of the share number, each dividend warrant 7 of all shares of one issue are provided on the rear side with a sequence of parallel linear marks 10 of equal lengths (see FIGS. 3 and 4), which form groupwise code signs 20 (FIG. 3). These marks 10 define on each dividend warrant 7 and in the heading on the tally 4, a code zone 11 which contains the printed or readable information (number of the share, number of the dividend warrant, the nominal value) and a few further data in a coded form. The lines 10 are preferably printed with a magnetic ink, so that mechanical reading can be carried out in a simple manner. Of course, a different kind of ink, for example an ink differing by its electrical conductivity, dielectric constant or optical phenomena from the carrier or sheet 2 may be employed also.

Since the marks 10 forming the code signs are provided only for return checking purposes of dividend warrants or certificates and are not intended for use of the public, it is less objectionable to print the linear marks so that they are not conspicuous at all or scarcely visible. This can be achieved by choosing the ink for printing the code marks and the substratum in more or less identical colors.

As stated above the sequences of linear marks 10 define a zone 11 extending in the longitudinal direction of a warrant 7. Such a zone is indicated in FIG. 1 for the sake of simplicity only for the tally 4 and a few dividend warrants. As seen in FIG. 2, the zone 11 is bounded by the imaginary broken lines *a—a* and *b—b* extending parallel to the longer sides of the rectangular initial shape of the dividend warrant indicated by the broken line 9. Said code marks 10 are formed in groups defining code signs 20. The width of a zone 11, i.e., the length of the marks 10 is chosen so that it is at least one quarter of the initial dimension *h* (FIG. 2) of a dividend warrant 7. The zone 11 extends over the part of the dividend warrant outlined by the frame 8. The front side of each warrant 7 contains the readable information. As is shown in FIG. 2, zone 11 extends midway along warrant 7, and the width of said zone (distance between the lines *a—a* and *b—b*) is about 20 mm., while the initial width *h* of the dividend warrant is about 45 mm. The marks 10 are furthermore provided in that part of the zone 11, which extends over the longitudinal length of the frame 9.

When the public cuts or tears off a dividend warrant 7 from tally 4 as illustrated in FIG. 1, it may be expected that even though the warrant is carelessly removed it will not be torn or cut across the frame 8, since the written information is contained within the frame 8. The full line 12 of the dividend warrant shown in FIG. 2 indicates a carelessly cut-off warrant 7. However, such mutilation does not prevent the information contained in the zone 11 by the marks 10 from being read mechanically. To read the code signs 2 a dividend warrant is passed, for example in the manner known for punched cards, by means of a conveyor, in a chute, along a reading device. In the present case the dividend warrants 7 can be passed with their rear sides, containing marks 10, turned upwards. The width of the chute is slightly larger than the initial width *h* (see FIG. 2) of said warrants, whereupon the marks 10 can be scanned by means of a reading device, i.e., a magnetic reading head in the case of magnetic ink, said head being arranged centrally above said chute. Since the linear marks 10 are provided in a comparatively wide zone 11, which extends, moreover, centrally of the part of the warrant which has been left undamaged, it will be apparent that all the code marks 10 pass beneath the reading device. It is not necessary that the longitudinal direction of the zone 11 coincides accurately with the direction of movement of the dividend warrant relative to the reading device, provided the angle therebetween is not so large that parts of successive linear marks are scanned simultaneously. The warrants normally need not be especially oriented in the said chute, since the orienting effect of the walls of the chute will suffice. By checking the output signals of the reading device it can be assessed whether incorrect scannings are performed. This can be observed immediately, so that the conveyor can be stopped, for example automatically, or the dividend warrant concerned may be routed to a special collector for further inspection which may also be done automatically.

A detailed illustration of code zone 11 is given in FIGS. 3 and 4. FIG. 3 shows the zone 11 between the lines *a—a* and *b—b* of the dividend warrant shown in FIG. 2. Within the part of said zone outlined by the frame 8 there are provided a total of seventeen code signs 20, each consisting of a group of five linear marks 10 (FIG. 4). FIG. 4 shows the linear marks 10 forming a few code signs 20; the scale of said figure in the horizontal direction being considerably larger than that of FIG. 3. The code signs 20, with the exception of the two outer signs (F and S), represent in FIGS. 3 and 4 from left to right a decimal information, i.e., in order of succession: the number of the share (by way of example 0007203) with which the dividend warrant is or has been associated. Said share number is given by the seven code signs *p* in FIG. 3, the number of the dividend warrant (here 056) is given by the three code signs *q*; a number (here 02) comprising two digits, indicated by the two code sign *r* represents the nominal value of the share and finally a number (here 142), indicated by the three code signs *t*, representing the firm issuing the shares. Since in the present case the correct information is obtained by interpreting in FIGS. 3 and 4 the code signs of the zone 11 from left to right, or in other words, since the correct interpretation is given by a given direction of reading, this direction of reading is indicated by a code sign S (start) preceding the sequence of code signs in the groups *p, q, r* and *t* and a code sign F (finish) closing said sequence of code signs. The code signs S and F each produce a characteristic electric signal independent of whether they are scanned from left to right or from right to left. If the scan of a dividend warrant provides first a signal which corresponds to the closing sign F, whereas a signal corresponding to the starting sign S comes last, the correct interpretation can be obtained by reading out the signals received in a reverse order in an intermediate memory device, for example one or more shift registers.

The code used in the embodiment shown in FIGS. 3 and 4 is a five-line code, i.e., each sign 20 consists of five lines 10, in which the distance between successive code signs 20 has either a given small value or a given large value, for example double the small value. If a single line 10 represents numeral 1, and a small distance represents 0, and a large distance represents 00, the code sign used in the example for the digit 0 can be characterized by 100101001001, the digit 1 by 1001010101, the digit 2 by 1010010101, and so on and the starting sign S and the closing F by 10010101001 and 10100100101 respectively. This invention is, however, not limited to the use of this or a similar five-line code. A seven-line code, for example, has the advantage that errors are automatically signaled. Other kinds of codes, for example binary or biquinary decimal codes and non-decimal codes may be used, for example by expressing the numbers of the aforesaid groups *p, q, r* and *t* each completely in a binary code.

In the example illustrated in FIGS. 1 to 4 the whole sequence of seventeen code signs 20 requires a minimum length of about 60 mm., if the width of the marking lines 10 is 0.15 mm., and for the small distance between successive marking lines of a code sign, a 0.15 mm. space is utilized while for the large distance a 0.35 mm. is used, and a space of about 1.5 mm. is left between successive code signs. The zone 11 within the frame 8 will have sufficient length to leave an intermediate space between groups of code signs (*p, q, r, t,*) which is larger than that between successive code signs in a group. Thus a given space may be left between the group *p* and the next-following group *q*. The group *p* represents the number of the share, which upon printing the shares of an issue differs from share to share. The number of a dividend warrant, indicated by the group code signs *q* differs only between the various warrants of the same share or sheet, while for corresponding dividend warrants of all shares, i.e., each share of the issue, the number of the code *g* is the same. In printing an issue of shares from identical sheets having a mantle-warrant and a tally, the numbered dividend warrants 7 are printed first, after which, in a separate run, each sheet (1 and 2, FIG. 1) is provided with the share number of the issue, that is, the share numbers are simultaneously printed on the mantle-warrant, on the tally and on each of the dividend warrants 7. The share number is printed of course with the aid of a numbering machine which increases by one each time and which is coupled with a counter. In accordance with the invention the code marks 10 in zone 11 can be advantageously printed, simultaneously with the printing of the share-numbers.

Figure 5:
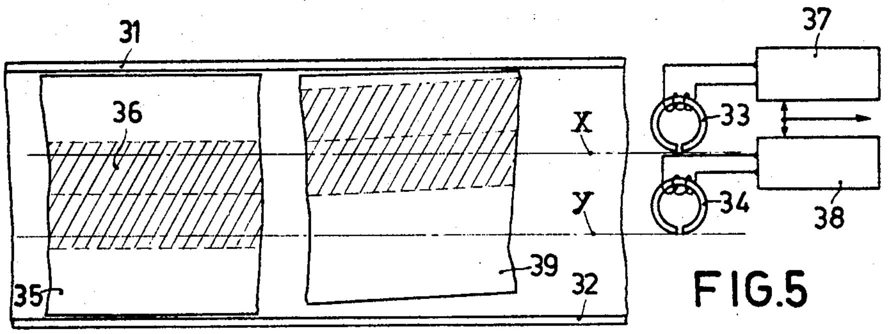
FIG. 5 illustrates diagrammatically the mechanical reading of a record carrier according to the invention, in which the record carrier is scanned along two parallel lines

A series of separate dividend warrants or coupons 7 provided with marking lines according to the invention can be read mechanically with the aid of a device comprising a conveyor and chute, above the centre of which there is arranged a reading device adapted to the nature of the marking lines, for example a magnetic reading head or the like. FIG. 5 shows diagrammatically a scanning device comprising two reading members, symbolized for the sake of simplicity by magnetic reading heads. Said device is particularly suitable for mechanical reading of record carriers having marking lines, the length of which exceeds one third of the initial width of said carriers, while the centre line of the zone 11 of the marking lines coincides with the initial centre line of the carrier in the longitudinal direction thereof. The device shown in FIG. 5 comprises a chute having side walls 31 and 32. A conveyor belt (not shown) passes, in known manner, through said chute adjacent the lower end of said side walls. The conveyor belt carries dividend warrants or coupons beneath the two reading heads 33 and 34. The distance between the side walls 31 and 32 slightly exceeds the initial width (*h*, FIG. 2) of a dividend warrant or coupon to be read by said device. A dividend warrant travelling through the gutter is scanned by the reading head 33 along the dot-and-dash line X and by the reading head 34 along a similar line Y. The reading heads are arranged so that said lines *x, y,* divide the space between the walls 31 and 32 into three parts of equal widths. Electrical signals supplied by the reading head 33 are stored in a memory device 37, for example a shift register and the signals from the reading head 34 are held in a similar memory device 38. When said scanning device reads the code marks or lines defining a zone 36, on a dividend warrant 35 cut off exactly along the intended circumferential line (9, FIG. 2), said code will be read by both reading heads 33 and 34, so that the memories 37 and 38 obtain exactly the same information. It is clearly evident that the two scanning lines X and Y extend completely through the zone 36. FIG. 5 also shows a warrant 39 which was not cut off according to its intended form. The code zone 36 now has a different position relative to the longitudinal edges of the warrant but it is intact. Owing to the width of the zone 36 each code line 10 in the zone 36 is read by at least one of the heads 33 or 34 irrespective of the position of the warrant in the chute. If the warrant 39 occupies on the conveyor belt the position indicated in FIG. 5, the marking lines are read only by the head 33, so that the information to be processed is found only in the memory 37. In a different position of the said warrant 39 part of the marking lines may be read only by the head 33 and a further part may be read only by the head 34, and further, a number of the marking lines may be read by both heads. The complete information represented by the zone 36 of the dividend warrant can then be found in the two memories 37 and 38 together and by reading the two memories simultaneously it can be obtained therefrom.

In contradistinction to the examples described above with reference to FIGS. 1 to 5 a record carrier according to the invention may be provided on both sides with code lines 10, said lines representing on both sides the same information. On each side the marking lines define a code zone, the width of each zone is at least one quarter of the initial dimension (*h*) of the record carrier. The provision of code zones representing the same information on each side of a record carrier or dividend warrant 7 has the advantage that, when the scanning device is capable of reading both sides of the carrier, it makes no difference which side of the warrant is facing up; and furthermore the results of reading both sides must be the same so that it is possible to check whether warrants sticking together are passed in common along the reading heads.

Figure 6:
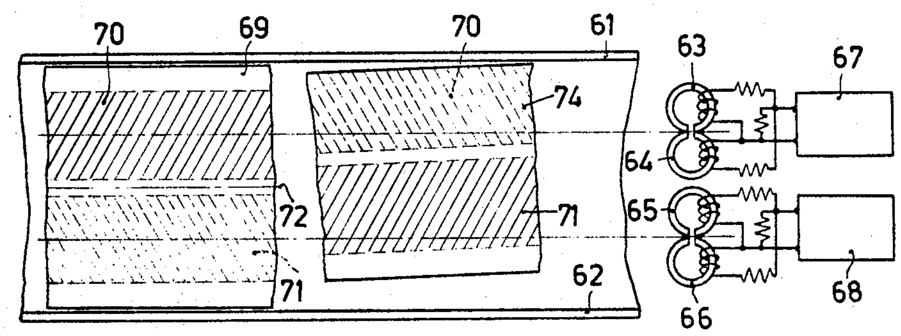
FIG. 6 illustrates diagrammatically a mechanically reading process of a record carrier according to the invention, provided on both sides with linear marks.

FIG. 6 shows diagrammatically an embodiment of a scanning device for record carriers provided on both sides with code zone. Said scanning device comprises a known conveyor chute having sides 61 and 62. At approximately a first quarter and again at approximately a third quarter of the width of the chute defined by the side walls 61 and 62 there are arranged two reading devices 63, 64 and 65, 66 respectively in the form of magnetic reading heads, so that the heads 63 and 65 scan one side, i.e., the top side and the heads 64 and 66 scan the other side, of a record carrier passed through the gutter between the heads of each pair. The signals from the heads 63 and 64 are temporarily stored in a memory 67 and the signals from the heads 65 and 66 in the memory 68.

FIG. 6 shows by way of example on the left-hand side a warrant or carrier 69 having code zones 70 and 71 which are symmetrical relative to the centre line 72 extending in the longitudinal direction of the carrier 69. The width of each zone 70, 71 slightly exceeding one third of the width of the carrier. In this position of the carrier 69 the zone 70 is turned upwards. The zone 71 is therefore on the bottom side. When said carrier is passed between the reading heads, the zone 70 is read by the head 63 and the zone 71 by the head 66. A mutilated warrant or carrier 74 is indicated on the right-hand side of the carrier 69. The carrier 74 has been cut off carelessly. The carrier or warrant 74 lies approximately with one edge along the side wall 61, while the code zone 70 is located on the upper side. The information of the zone 70 is read by the head 64, whereas the zone 71 is read by the head 65. Thus it makes no difference whether the record carrier is positioned with one side or with the other upward in the chute 61, 62.

If a zone of code lines is provided on a side of a carrier, where in addition readable information is also provided, and moreover the code zone extends over the latter information—which will often be the case in the example described with reference to FIG. 6—the marking lines are printed with a transparent ink, which differs for example by its dielectric constant, or its fluorescent capacity from the substratum. The embodiments of the reading heads 63 to 66 shown in FIG. 6 in the form of magnetic heads are only symbolic; as a rule a reading device tuned to other properties of the marking lines will be preferred for the above reasons.

What is claimed is:

1. An information storage system comprising a substantially rectangular printed document of predetermined size with coded information printed thereon corresponding at least in part to readable information printed on said document, said coded information being positioned in a zone on said document, said zone extending parallel with one edge of said document and having a width not substantially less than one quarter of the corresponding predetermined dimension of said document, a plurality of parallel linear variably spaced code marks in said zone, said marks extending the full width of said zone; a conveyor means for transporting said printed documents, said conveyor means having a width larger than said predetermined width of said printed document for receiving said printed documents which may vary in size and vary in position; and means for reading said coded information on said document, said reading means including at least one scanning head, said scanning head being positioned adjacent said conveyor for scanning said zones on said variably sized and variably positioned printed documents.

2. An information storage system according to claim 1 wherein the coded information is printed on the front face and the back face of said document and the reading means includes at least one scanning head for scanning each of said faces of said document.

References Cited

UNITED STATES PATENTS 3,220,301 11/1965 Koonz ------------ 235—61.12

MAYNARD R. WILBUR, *Primary Examiner.*

W. J. KOPACZ, *Assistant Examiner.*